UNITED STATES PATENT OFFICE.

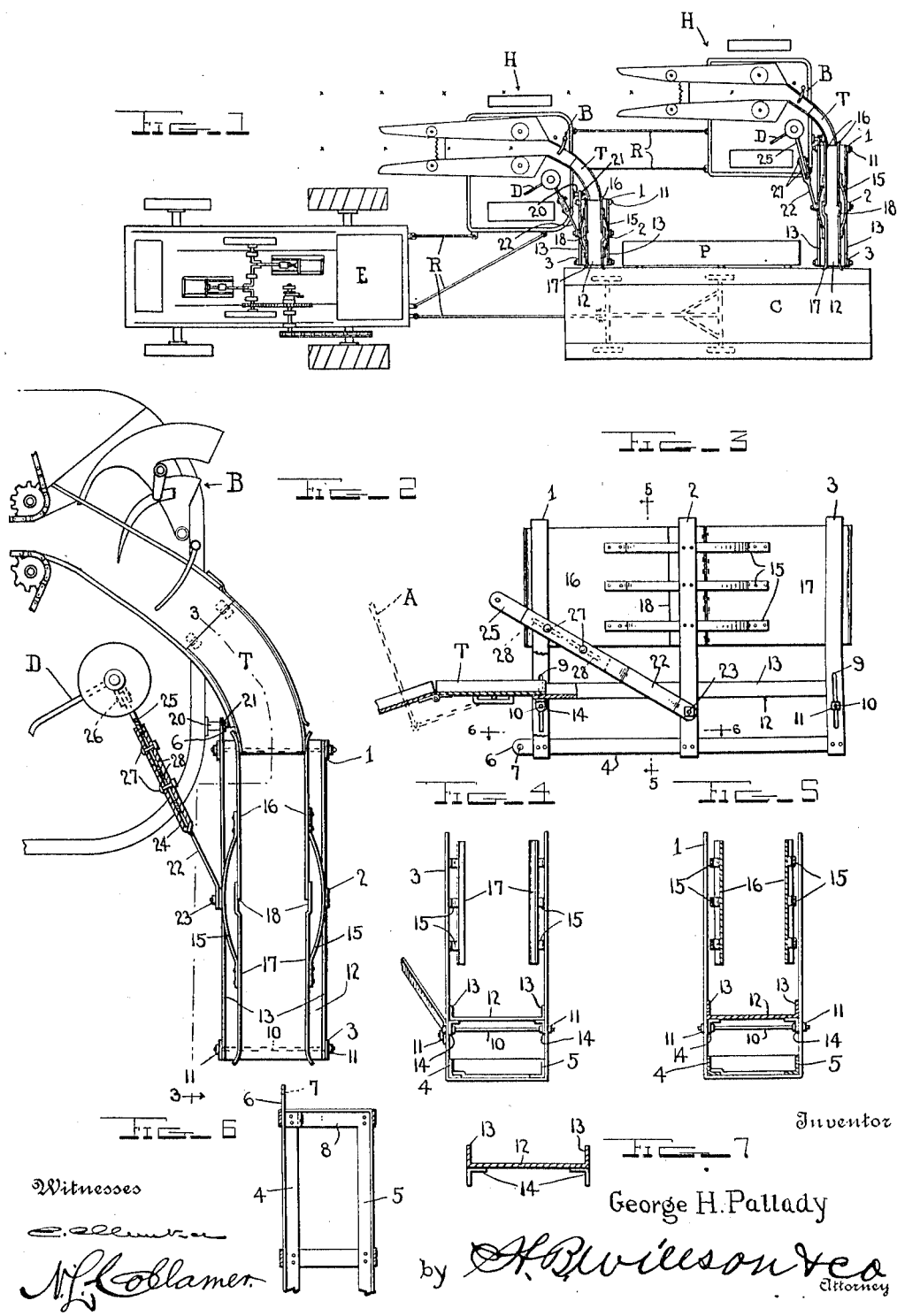

GEORGE H. PALLADY, OF ALLERTON, IOWA.

SHOCK-CONVEYER.

1,090,337. Specification of Letters Patent. Patented Mar. 17, 1914.

Application filed February 6, 1913. Serial No. 746,612.

*To all whom it may concern:*

Be it known that I, GEORGE H. PALLADY, a citizen of the United States, residing at Allerton, in the county of Wayne and State of Iowa, have invented certain new and useful Improvements in Shock-Conveyers; and I do declare the following to be a full, clear, and exact description of the invention, such as will enable others skilled in the art to which it appertains to make and use the same.

This invention relates to the general class of harvesters, and more especially to binders which automatically tie up the corn or other cereal harvested and deliver it over the table in bundles or shocks; and the object of the invention is to produce an improved conveyer or trough whereby said bundles or shocks may be carried upright or in a standing position from said table to a bundle carrier and delivered into the same, instead of being dropped upon the field.

In the following specification I have described the invention as applied to a corn harvester, and shown it as applied to a pair of corn harvesters drawn by a traction engine or tractor, although it will be clear that the conveyer would be useful for carrying bundles or shocks of any kind of cereal from the harvester and binder to the carrier, and I do not, therefore, wish to be confined to the use of this conveyer on a corn harvester although it is so described and claimed below and shown in the drawings wherein—

Figure 1 is a plan view giving a diagram of two corn harvesters drawn by a tractor which also draws a bundle carrier, showing the use of two of my improved conveyers for delivering the shocks from the harvester-tables to the carrier. Fig. 2 is an enlarged view of the rear end of one of the harvesters and its table, showing my conveyer in plan and its manner of attachment to the harvester frame. Fig. 3 is a front elevation of the conveyer, and a section of other parts on about the line 3—3 of Fig. 2. Fig. 4 is an elevation of the outer end of the conveyer, and Fig. 5 a vertical section on about the line 5—5 of Fig. 3. Fig. 6 is a horizontal section on the line 6—6 of Fig. 3. Fig. 7 is a sectional detail through the pan.

In the drawings I have diagrammatically illustrated two corn harvesters H, H connected by chains or rods R with a tractor E and drawn thereby a little in rear and to one side thereof so that the harvesters or binders will gather the corn in two rows, herein indicated by the two dotted lines. The letter C designates a bundle carrier, also connected with the tractor by a chain or rod R and drawn thereby; and it is the purpose of the present invention to provide a conveyer whereby the bundles or shocks will be delivered from the harvesters to this carrier. The structure of each harvester need be no further described than to say that B is its binding mechanism and D are the bundle discharge arms which eject the bundles or shocks to the rear over the table T, and the rear or outer end of the latter is adjustable vertically in any suitable manner as indicated by the dotted lines A in Fig. 3. No novelty is claimed for the parts thus far described.

Coming now to the present invention, the conveyer or trough forming the subject matter hereof is by preference constructed of light angle-iron, and when made of the ordinary length it includes about three U-shaped members 1, 2, and 3 standing upright and parallel with each other, and a pair of sills 4 and 5 which may be secured through their angles, the sill 4 preferably having an extension 6 pierced with an eye 7 at its inner end, and the sill 5 having an extension 8 bent at right angles to its inner end and carried across the structure and secured to the opposite sill 4. If the conveyer be of greater length, there would doubtless be more intermediate members 2 than shown in Fig. 3, but the end members 1 and 3 are slotted as at 9 to receive cross rods 10 having nuts 11 inside and outside the upright arms of said members, so that the rods may be adjusted. The pan 12 best seen in section in Fig. 7 and which forms the bottom of the conveyer or trough, is by preference made of light sheet metal having its edges bent upward into flanges 13, and L-shaped brackets 14 are secured to its bottom near its extremities in position to receive the cross rods 10, so that when the latter are adjusted the entire pan is adjusted within the skeleton framework above described. Secured inside the arms of the intermediate member 2 are leaf springs 15 whose extremities bow inward as best seen in Fig. 2, and attached to said extremities are upright plates 16 and 17, the outer end of the former overlapping the inner end of the latter as seen at 18. The construction is such that these plates are yieldably supported by the several springs 15, and while pressed normally inward toward the center of the conveyer, they are capable of being pushed outward against the tension of the springs for a purpose yet to appear.

The support for this conveyer is well shown in Fig. 2. On a stud or bolt 20 projecting from the frame of the harvester H is mounted the eye 7 in the extension 6 of the sill 4, a split pin 21 or other suitable device being provided to keep it in position. The trough is furthermore sustained at about its midlength by means of an oblique brace which comprises an outer member 22 bolted or otherwise connected as at 23 to one of the arms of the intermediate member 2, and by preference forked at its inner end as at 24. The support also comprises an inner member 25 connected in any suitable manner at the point 26 with the harvester frame, and having its lower and outer end passing between the arms of the fork 24 and adjustably mounted therein by means of bolts 27 which pass through said fork-arms and through slots 28 formed in the member 25. This description and illustration are merely typical of one means which may be employed for adjusting the length of the supporting element. The latter connects some elevated point on the harvester frame with a point 23 at about the midlength of the conveyer, and obviously sustains the weight of the same, its inner end being firmly but pivotally supported on the stud 20. The parts are so proportioned and of such strength that no other support for the conveyer will ordinarily be required. The right hand conveyer shown in Fig. 1 is somewhat longer than the left hand conveyer illustrated therein, but its construction is substantially the same.

The use of this device is as follows: When one or perhaps several harvesters H are attached as at R to a tractor E, and a bundle carrier C also attached to and drawn by said tractor, it will be clear that some means are necessary for conveying the bundles or shocks from the harvester tables T across the space intervening between them and the bundle carrier C, as such tables are ordinarily constructed with the intent that the shocks shall be dropped behind and a little to one side of the harvester. This improved conveyer is then brought into use, and its eye 7 is attached to the stud 20 of the harvester, the support being connected with the points 26 and 23 and adjusted in length so that the floor or pan 12 of the conveyer shall have the proper inclination. Its inlet end stands contiguous to the outlet end of the table, and its outlet end must stand adjacent the bed of the carrier C as indicated at the right of Fig. 1. It may be necessary to set the conveyer at a slight upward inclination or perhaps at a slight downward inclination, but it is my intention that all adjustments necessary can be effected by means of setting the bolts 27 within the slots 28. Meanwhile the height of the floor or pan 12 within the skeleton framework of the conveyer can be regulated by loosening the nuts 11 on the cross rods 10 and setting said pan as may be desired; and of course the table T can be adjusted by the mechanism A on the harvester so that it will coact with the position of said pan. The tractor E is then started forward, and the harvesters H gather the corn and bundle it into shocks which are delivered by the arms D over the tables T into the inner ends of the conveyers, and therein they accumulate between the spring-pressed plates 16, 16 which are therefore urged apart slightly. More shocks follow and are pressed into the inner end of the conveyer, and those already therein move along over the pan 12 so that the plates are spread apart at the points 18, 18. This spreads apart the inner ends of the outer plates 17, 17, and as the shocks accumulate (standing upright on their butt ends) the last-named plates are pressed apart as the springs 15 permit, and the shocks traverse the space between the tables T and the bundle carriers D. There will doubtless be one or more operators standing on the small platform P at one side of the carrier C, who with their pitch-forks will place on the carrier the bundles which are fed along the conveyer, or who will be in position to attend to any congestion in the conveyers which might possibly occur. However, if the parts are properly proportioned, and especially if the springs 15 are of the proper number and tension, it will be found that the shocks while standing upright will move along the length of the conveyer automatically, whether its pan is inclined upward or downward or stands strictly horizontal.

I do not wish to be limited to the precise details of construction, and as intimated at first I lay no claim to the parts designated in this specification by reference letters.

What is claimed as new is:

1. The herein described conveyer for corn shocks and the like, comprising a skeleton framework, a series of leaf-springs attached to the sides of the framework, and at each side of the conveyer a plate attached to one end portion of said springs and another plate attached to the other end portion of said springs with its forward edge engaging the rearward edge of the first-named plate, for the purpose set forth.

2. The herein described conveyer for corn shocks and the like, comprising a series of upright U-shaped members, sills connecting their bends, a pan secured between their arms and constituting the floor of the conveyer, leaf-springs attached to the arms of the intermediate member, and at each side of the conveyer a plate attached to one end portion of said springs and a plate attached to the other end portion of said springs with its forward edge overlapping the rearward edge of said first-named plate, for the purpose set forth.

3. The combination with a shock conveyer comprising a skeleton framework having an extension from one of its inner lower corners pierced with an eye adapted to receive a stud projecting from a harvester, and spring-pressed plates within said framework constituting the sides of the conveyer; of a support consisting of one member adapted to be attached to the harvester and having slots in its body, a second member attached at its outer end to said framework and having a fork at its inner end standing astride the first-named member, and bolts through the fork-arms and said slots, for the purpose set forth.

In testimony whereof I have hereunto set my hand in presence of two subscribing witnesses.

GEORGE H. PALLADY.

Witnesses:
N. L. COLLAMER,
L. O. HILTON.

Copies of this patent may be obtained for five cents each, by addressing the "Commissioner of Patents, Washington, D. C."